United States Patent [19]

Su

[11] Patent Number: 4,945,935

[45] Date of Patent: Aug. 7, 1990

[54] CAR SHIELDING COVER

[76] Inventor: Yung-Fr Su, No. 28, Lane 9, Ming Yu Rd. Kang San Chen, Kaohsiung Hsien, Taiwan

[21] Appl. No.: 299,100

[22] Filed: Jan. 19, 1989

[51] Int. Cl.[5] ............................................. E04H 15/06
[52] U.S. Cl. ...................................... 135/88; 296/136; 383/120; 383/907; 383/66
[58] Field of Search ............................ 135/88; 296/136; 383/120, 127, 907, 66

[56] References Cited

U.S. PATENT DOCUMENTS

| | | | |
|---|---|---|---|
| 2,683,262 | 7/1954 | Foss | 383/66 |
| 2,703,428 | 3/1955 | Barkl | 383/66 |
| 2,733,747 | 2/1956 | Altschal | 296/136 |
| 3,291,373 | 12/1966 | Joyce | 383/120 |
| 3,316,012 | 4/1967 | Thier | 135/88 |
| 3,952,847 | 4/1976 | Via | 383/66 |
| 4,294,483 | 10/1981 | Ferris | 296/136 |
| 4,699,192 | 10/1987 | Kamen | 296/136 |

FOREIGN PATENT DOCUMENTS

| | | | |
|---|---|---|---|
| 692827 | 8/1964 | Canada | 135/88 |
| 1093239 | 11/1960 | Fed. Rep. of Germany | 135/88 |
| 7611389 | 4/1978 | Netherlands | 383/120 |

*Primary Examiner*—Henry E. Raduazo
*Attorney, Agent, or Firm*—Varndell Legal Group

[57] ABSTRACT

A simple car shielding cover, made of plastic film, being folded in a rectangular configuration, including a covering surface at the top to cover the top of car body, a rectangular opening at the bottom for insertion therethrough of car body, two closed ends having respective seaming lines, and two lateral inward folding surfaces to respectively cover the lateral sides of car body. The two lateral inward folding surfaces are outwardly disposed and define an inner space therebetween for receiving the car body. Two angular grooves are respectively defined by way of the covering surface and the inward folding surface around the seaming line. When the two angular grooves are respectively attached to the two bilateral ends of a safety bumper, the shielding cover is firmly secured to the bumper by way of the tensile force of the inward folding surfaces. When one end of the car shielding cover has covered over one end of the car body, the other end of the car shielding cover is efficiently dragged to the other safety bumper at the other end of the car body in the same manner without any special care.

2 Claims, 2 Drawing Sheets

CAR SHIELDING COVER

BACKGROUND AND SUMMARY OF THE INVENTION

In order to protect the car against weather change, that is against the erosion of wind, sunburning, rain, or acidic substances in the rain, a car shielding cover has been commonly used to cover the car when not in use. By means of the provision of shielding cover, the painting and the outer appearance of a car can be maintain in a good condition for a longer period. However, the existing car shielding covers are still not very practical in use and have the following drawbacks:

(1) The car shielding covers which are made of canvass are very heavy and not convenient to fold up for collection and storage. Because the material of canvas is water permeable, during raining days, the canvas car shielding cover can not provide good water-proofing effect.

(2) The car shielding covers which are made of plastic materials are more light and convenient to handle. However, these shielding covers can be blown away by wind. Therefore, regular plastic shielding covers are arranged with a plurality of retaining hooks around the opening edge to match with the associated retainer rings made around the bottom edge of the cars for fastening. Therefore, it is more complicated to cover a car with such a shielding cover.

The present invention provides a car shielding cover made of plastic film, which is light and water-proof, and which is easy to secure on a car in order to protect the car against weather erosion.

The main object of the present invention is to provide a plastic film car shielding cover wherein the shielding cover comprises a rectangular-shaped mounting opening to assist with the mounting of the shielding cover over a car body.

Another object of the present invention is to provide a plastic film car shielding cover wherein the shielding cover includes two closed ends having respective seaming lines, and two lateral inward folding surfaces, and wherein the two lateral inward folding surfaces are outwardly disposed to define an inner space therebetween for receiving car a body.

Another object of the present invention is to provide a plastic film car shielding cover wherein two angular grooves are provided and respectively defined by means of the covering surface and the inward folding surfaces near the seaming lines to facilitate secure mounting of the lateral inward folding surfaces over car safety bumpers so that the present invention can be securely mounted on a car against wind force.

A yet further object of the present invention is to provide such a plastic film car shielding cover having numerous features each of which tends to make the structure more simple, more practical to provide water-proof and weather-proof effect, and more convenient to use.

Further objects, features and other aspects of the present invention will be understood from the following detailed description of preferred embodiments of this invention referring to the annexed drawings.

DETAILED DESCRIPTION OF THE PREFERRED EMBODIMENTS

Figure 1:
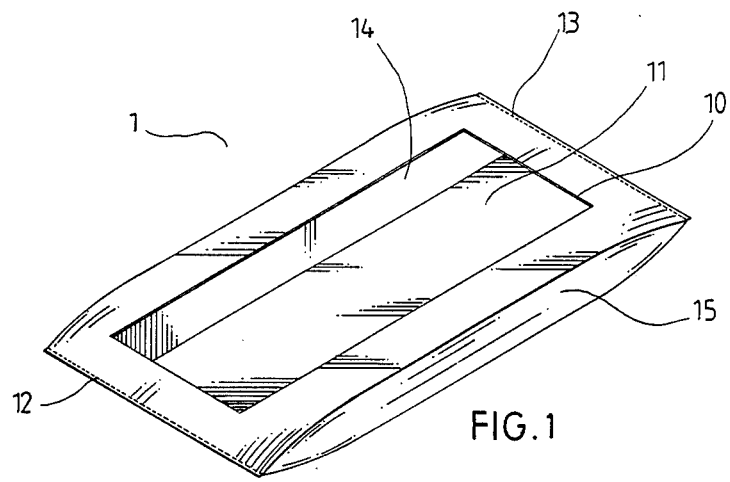
FIG. 1 is a perspective view of a car shielding cover constructed according to the present invention.
Figure 2:
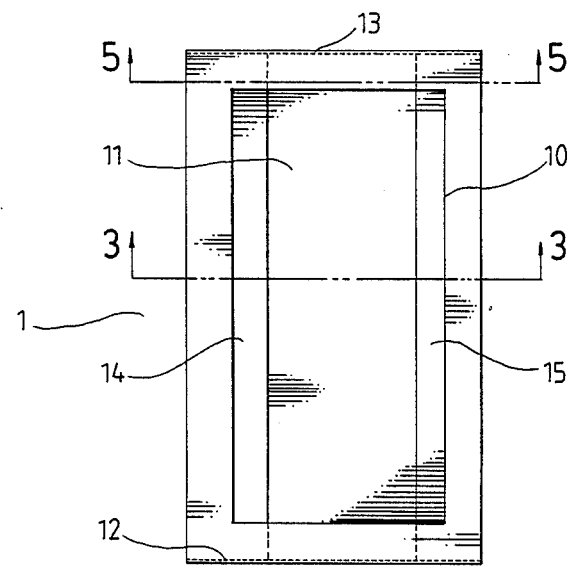
FIG. 2 is a front view of the said preferred embodiment.
Figure 3:
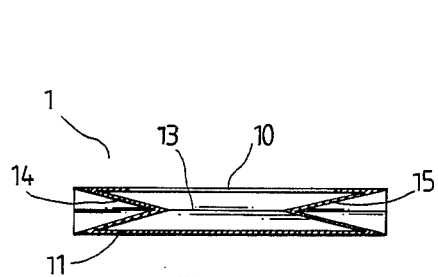
FIG. 3 is a sectional view taken alone line 3—3 of FIG. 2.
Figure 4:
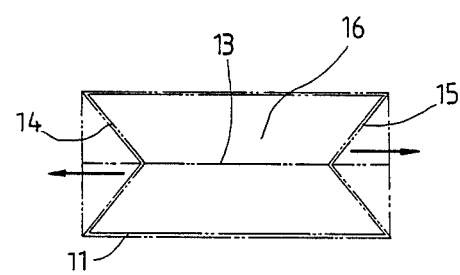
FIG. 4 is a schematic drawing, illustrating the process for opening the internal folding sides.

Referring to FIGS. 1 through 3, a plastic film car shielding cover 1 has a rectangular configuration when it is in a folded condition. Said car shielding cover 1 includes a covering surface 11 at the top, a rectangular opening 10 at a bottom, two closed ends having respective seaming lines 12 and 13, and two lateral inward folding surfaces 14 and 15, wherein said two lateral inward folding surfaces 14 and 15 may be outwardly disposed, as shown in FIG. 4, to define an inner space 16 therebetween for receiving a car body.

Figure 5:
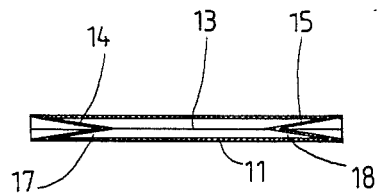
FIG. 5 is a sectional view taken alone line 5—5 of FIG. 2.
Figure 6:
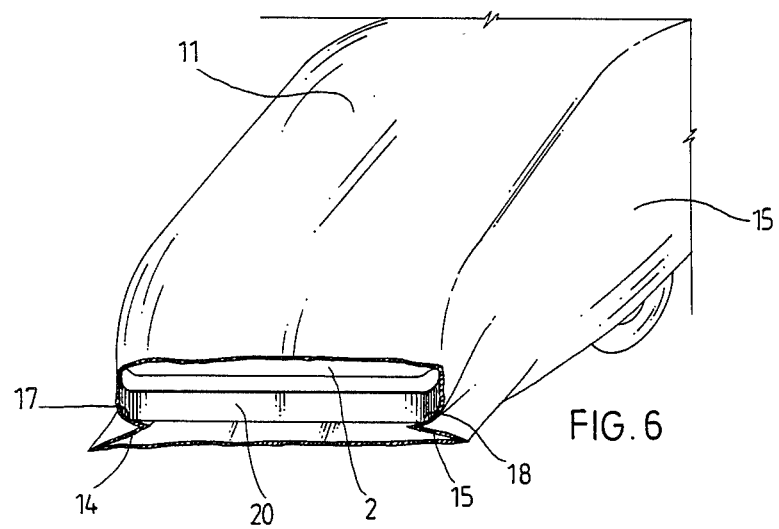
FIG. 6 is a perspective schematic drawing, illustrating the process to attach the angular slot over a safety bumper.
Figure 7:
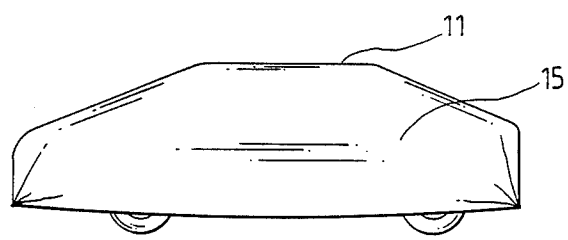
FIG. 7 is a plain view schematic drawing illustrating the application of the said preferred embodiment covering over a car.

Referring to FIGS. 5 through 7, in order to firmly secure said car shielding cover 1 to a car in a manner to protect against wind force, said car shielding cover 1 is arranged to cover a car through said opening 10. Said car shielding cover 1 includes two angular grooves 17 and 18 which are respectively defined by means of said covering surface 11 and said inward folding surfaces 14 and 15 at said seaming line 12 or 13. When said angular grooves 17 and 18 are respectively attached to the two bilateral ends of the safety bumper 20, said shielding cover 1 is firmly secured to the bumper 20 by means of said inward folding surfaces 14 and 15. Further, said inward folding surfaces 14 or 15 are superimposing upon the side edge of said opening 10 to provide better strength against tension force. When one end of said car shielding cover 1 has covered one end of the car body 2, the other end of said car shielding cover 1 is efficiently dragged to cover the other safety bumper at the other end of said car body 2 in the same manner without any special care. Because said car shielding cover 1 has good elasticity and tensile force, when one of said car shielding cover 1 is mounted on one bumper of the car body, the other end of said shielding cover 1 is easily pulled and securely mounted on the other bumper at the other end of the car body through said elasticity and tensile force. After having been arranged to cover a car, in addition to axially tensile force of said top covering surface 11, said lateral surfaces 14 and 15 are also elastically disposed to provide good tensile force through the arrangement of said angular grooves 17 and 18. Therefore, said car shielding cover 1 is very easy to operate and provides a practical weather-proofing and water-proofing effect to a car.

I claim:

1. A plastic car shielding cover comprising a rectangular top for covering a top of a car and a rectangular bottom surface for covering a portion of a bottom of said car and two side lateral surfaces for covering both sides of said car, said top and bottom surfaces being joined together by seams at their respective longitudinal ends, said lateral surfaces being joined to and interposed between respective latitudinal edges of said top and bottom surfaces, said bottom surface having a rectangular opening for receiving a car therein, said rectangular opening having a length and width less that than of said bottom surface for providing lips about edges of said bottom surface for covering said portion of said bottom of said car, said lateral surfaces having inward folding surfaces formed by a fold extending between said longitudinal ends, said folds and said seams forming angular grooves at said longitudinal ends for receiving bumpers of said car, said surfaces being made of a plastic material having sufficient elasticity for inserting one of said bumpers in one of said angular grooves, stretching said cover over said car and inserting another of said bumpers in another of said angular grooves and sufficient tensile strength for maintaining said cover on said car.

2. A plastic car shielding cover consisting of a rectangular top for covering a top of a car and a rectangular bottom surface for covering a portion of a bottom of said car and two side lateral surfaces for covering both sides of said car, said top and bottom surfaces being joined together by seams at their respective longitudinal ends, said lateral surfaces being joined to and interposed between respective latitudinal edges of said top and bottom surfaces, said bottom surface having a rectangular opening for receiving a car therein, said rectangular opening having a length and width less that than of said bottom surface for providing lips about edges of said bottom surface for covering said portion of said bottom of said car, said lateral surfaces having inward folding surfaces formed by a fold extending between said longitudinal ends, said folds and said seams forming angular grooves at said longitudinal ends for receiving bumpers of said car, said surfaces being made of a plastic material having sufficient elasticity for inserting one of said bumpers in one of said angular grooves, stretching said cover over said car and inserting another of said bumpers in another of said angular grooves and sufficient tensile strength for maintaining said cover on said car.

* * * * *